United States Patent Office 2,825,992
Patented Mar. 11, 1958

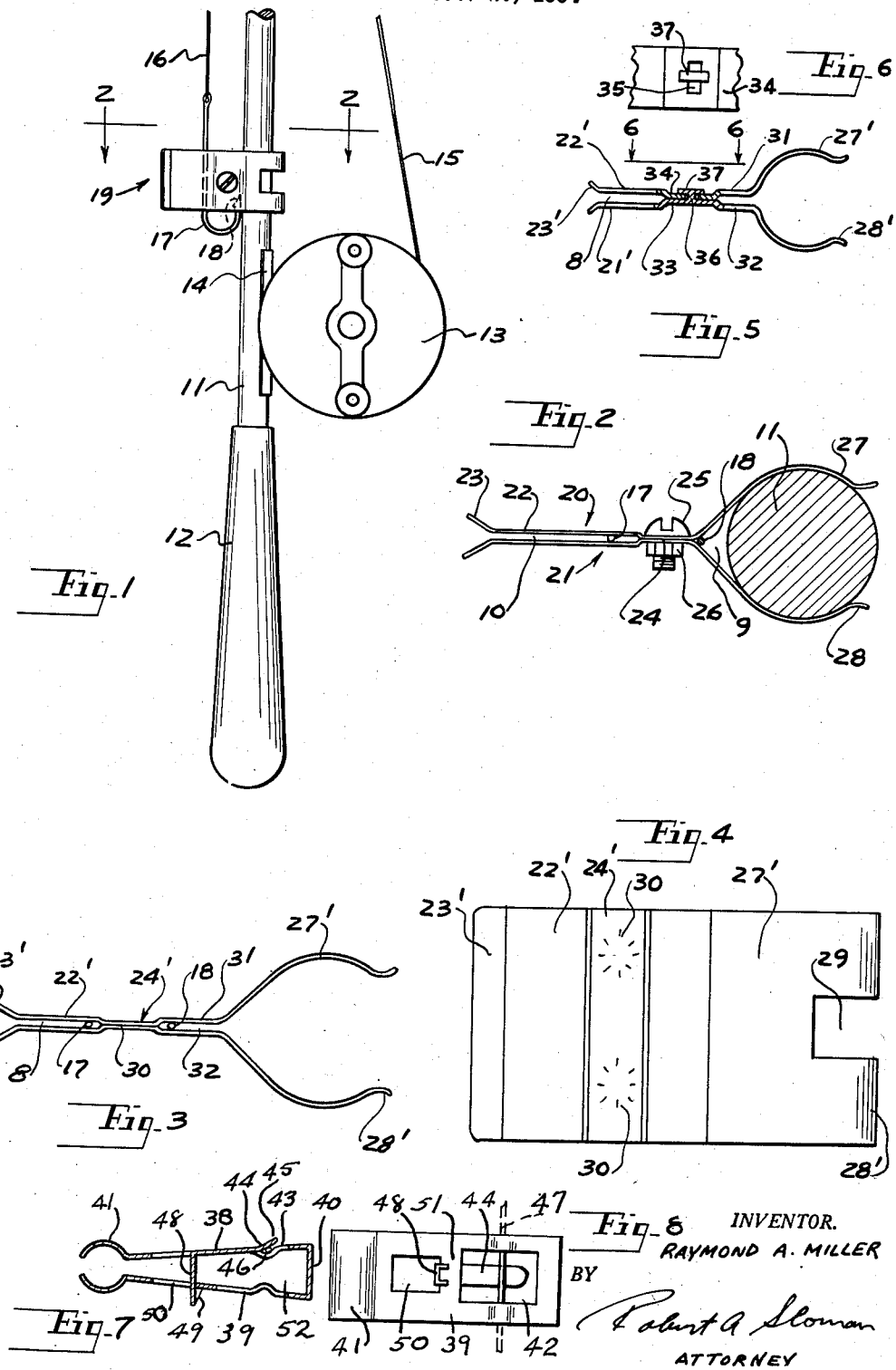

2,825,992

FISH HOOK CLAMP

Raymond A. Miller, Grosse Pointe Farms, Mich., assignor to Hall Gage Sales, Inc., East Detroit, Mich., a corporation of Michigan Application October 25, 1954, Serial No. 464,244

3 Claims. (Cl. 43—25.2)

This invention relates to a fish hook clamp, and more particularly to a clamp adapted for fastening upon the shaft of a fishing pole for receiving the fish hook carried by the fishing line.

Heretofore, there has been the objection to the freely swinging fish hook upon the end of the line or upon a leader in that said hook often becomes entangled with other objects and is dangerous in its uncontrolled movements.

It is the primary object of the present invention to provide a simplified clamp which will snap on to the rod of a fish pole and which has a slotted formation for snugly and supportably receiving a portion of the fish hook for maintaining the same stationary when not in use.

It is the further object of the present invention to provide a novel and simplified clamp which consists of a pair of opposed similarly shaped parts which are so interconnected as to form a simple fish hook clamp.

These and other objects will be seen from the following specification and claims in conjunction with the appended drawing in which:

Fig. 1 is a fragmentary and broken-away elevational view of a portion of a fish pole with the present fish hook clamp mounted thereon.

Fig. 2 is a section taken on line 2—2 of Fig. 1.

Fig. 3 is a similar view omitting the pole, but showing a slight variation in the clamp construction.

Fig. 4 is a plan view of Fig. 3.

Fig. 5 is a sectioned view similar to Fig. 3, illustrating a slightly different form of fastening means;

Fig. 6 is a fragmentary plan view of said fastening means.

Fig. 7 is a plan section of a slightly different form of fish hook clamp; and

Fig. 8 is a front elevational view thereof.

It will be understood that the above drawing illustrates merely a preferred embodiment of the invention and that other embodiments are contemplated within the scope of the claims hereafter set forth.

Referring to the drawing, there is fragmentarily shown in Fig. 1 the lower portion of fish pole 11, having a handle 12, and a conventional reel 13, secured thereon as at 14, said reel carrying and having extended therefrom the conventional fishing line 15.

Upon the end of the fishing line, or upon a suitable leader 16, there is secured fish hook 17, having a pointed barbed end 18.

In Fig. 1 the present fish hook clamp is generally indicated at 19 and is snap fastened upon the fish pole shaft 11, and the said fish hook 17—18 is retainingly positioned within the said clamp, as indicated also in Fig. 2.

Referring to Fig. 2, the present clamp 19 includes a pair of symmetrical oppositely arranged plates 20 and 21, which are suitably interconnected intermediate their ends to form the present clamp.

The said plates have elongated laterally displaced parallel spaced portions 22 defining hook receiving slot 10, with their outer opposed edges terminating into outwardly tapered ends 23, which provide a throated enlarged opening for guiding the said hook 17—18 into slot 10.

Intermediate the ends of plates 20 and 21, there is provided the contacting portions 24, which are laterally displaced inwardly from the parallel portions 22 and which are secured together in a suitable fashion. In the preferred embodiment shown in Fig. 2, these portions are transversely apertured to receive the small bolt 25 which is secured to the said plates by the nut 26.

The opposite ends of the said plates have opposed outwardly projected arcuate portions 27 adapted to engage around the fish pole shaft 11 and to retainingly engage the fish pole for maintaining the clamp in the position shown in Fig. 1. The outer ends of the said arcuate portions 27 are curved outwardly as at 28 Fig. 2, to facilitate the snapping of the present hook clamp around a portion of the shaft 11 of the fish pole.

In the preferred embodiment of the invention, the said plates are constructed of a resilient material, such as spring steel. However, it is contemplated that any other resilient material may be employed, such as plastic material, whereby the said clamp may be snapped on to the fish pole shaft in such a fashion that it will stay on, and at the same time may be easily disengaged therefrom.

Similarly, this resiliency is also important in the frictional grasping of portions of the fish hook 17 between the plate elements 22 so that the hook will not be accidentally dislodged therefrom.

The variation in the construction of clamp shown in Fig. 3, hereafter described in detail, does not depart substantially from the structure of Fig. 2. The plan view in Fig. 4, which is primarily directed to Fig. 3, would be substantially the same as Fig. 2, except for the omission of the bolt 25, and certain other plate formations hereafter described.

Nevertheless, the arcuate end portions 27 of the said plates are bifurcated by virtue of the slots 29 formed in their outer ends, which slotted formations common to the structures of Figs. 2 and 3, thereby increase the resiliency of the end portions 28 or 28' to facilitate mounting of the said clamp upon the fishing rod shaft.

Also in Fig. 2 there is provided a wedge-shaped space 9 at the apex of the opposed curved portions 27, and as illustrated further in Figs. 1 and 2, when the hook 17 is positioned within the slot 11, the barbed end 18 extends around the central portion 24 of the said plates and projects into the space 9 so that the said barb is protectively nested within the clamp.

The variation of the clamp structure shown in Fig. 3 includes a pair of symmetrical plates having the laterally displaced portions 22' which define hook receiving slot 8 and terminate in the outwardly tapered end portions 23', corresponding to Fig. 2. Said plates also have the intermediate contacting portions 24' which in Fig. 3 are suitably welded together as at 30, as another means of fastening the plates together.

This variation also has the arcuate portions 27' terminating in the out-turned elements 28' corresponding to the unprimed elements of Fig. 2. There is a slight variation at the inner ends of the arcuate portions 27' inasmuch as the same terminates in the parallel spaced elements 31 substantially parallel to elements 22' to thereby define an elongated barb receiving slot 32, as distinguished from the triangular apex 9 of Fig. 2, the said slot 32 functioning in substantially the same manner as aperture 9 of Fig. 8, except that the said wall portions 31 provide additional friction contact with the barb 18 for removably securing the same within the clamp.

While bolt 25 has been shown in Fig. 2 and a weld 30 shown in Fig. 3, as preferred methods of securing the plates together, it is contemplated that other means may be provided, such as the upsetting or formation of the contacting portions 24 or 24' in such a fashion as to provide interconnecting means which may be engaged and disengaged for securing the two plates together.

Figs. 5 and 6 illustrate a slightly different method of interconnecting the clamp plates 21' and 22', which otherwise correspond to the clamp plates shown in Fig. 3 and have the same numeral designations, except for the central inwardly displaced contacting portions 33 and 34 of the said plates 21' and 22'.

One of the plates 21' has formed at its central contacting portion 33 an upwardly projecting longitudinally disposed locking key 37, which is spaced upwardly from central element 33 and is adapted for positioning through a transverse slot 35, formed in the corresponding central portion 34 of the clamp element 22'.

In assembly, the two clamping plates are arranged at right angles to each other so that the locking key 37 may be inserted within slot 35, after which the parts are relatively rotated into substantially parallel alignment to the position shown in Fig. 6, so that the said clamping plates are interlockingly engaged with each other to complete the clamp structure.

A slight variation of the present fish hook clamp is illustrated in Figs. 7 and 8, wherein the said clamp is constructed of one piece.

This clamp is generally of U-shape as shown in Fig. 7, and includes a pair of integral oppositely arranged plates 38 and 39 with a base portion 40. The free ends of said plates include a pair of oppositely arranged arcuate clips 41, which are normally arranged in spaced relation and are adapted to grippingly engage around a portion of shaft 11 of the fish pole shown in Fig. 1. Plate 39 has a punched out rectangular opening 42, and a similar opening 43 is formed within plate 38 but opposite from opening 42. However, in the formation of the aperture 43 there is struck out from a portion of the metal plate 38 the flexible tongue 44, which is slightly outturned as at 45. Formed within the top and bottom bounding walls defining aperture 43 are a pair of vertically aligned depressions 46 of substantially V-shape which are adapted to receive the shank 47 of a fish hook similar to fish hook 17—18 of Fig. 1, the said tongue 44—55 retainingly engaging the opposite side wall of said shank for securing that portion of the fish hook with respect to plate 38.

There is also provided a clasp 48 which is struck out from a portion of plate 38 at substantially right angles to the plane thereof, and said clasp has a laterally projecting head 49 upon its outer end which is adapted to project through aperture 50 in plate 39 with said head retainingly engaging the wall portion 51 which bounds one side of aperture 50 in order to secure the two pole gripping clasp 41 with respect to the rod 11. The said clasp 48 is sufficiently resilient in order to permit manual disengagement of said clasp 48—49 from plate 39 as desired.

In use, the shank is secured within the notches 46 by the said tongue 44 and the barbed end thereof is adapted for projection up into the hollow portion 52 of the said clamp as indicated in Fig. 7.

Having described my invention, reference should now be had to the claims which follow for determining the scope thereof.

I claim:

1. A fish hook clamp adapted for fastening upon the shaft of a fish pole having a line and hook comprising a pair of symmetrical oppositely arranged plates of resilient material, intermediate portions of said plates being in contact and interconnected, said plates having at one of their one ends opposed outwardly projected arcuate portions adapted to engage around said pole, the opposite ends of said plates having elongated laterally disposed parallel closely spaced portions defining an elongated slot to retainingly receive the shank of a fish hook therebetween, the arcuate portions at their apex defining a slotted recess whereby the barb of said hook may extend around said intermediate portion in such manner as to be protectively nested within said recess.

2. The clamp of claim 1, wherein said recess is defined by a pair of parallel spaced elongated slot defining portions of said plates.

3. The clamp of claim 1, said intermediate portions being respectively formed with a right angularly related projecting locking means and a slot, whereby said plates may be secured together in interlocked relation.

References Cited in the file of this patent

UNITED STATES PATENTS

| | | |
|---|---|---|
| 404,747 | Teed | June 4, 1889 |
| 404,749 | Teed | June 4, 1889 |
| 782,460 | Northrop | Feb. 14, 1905 |
| 884,256 | Addie | Apr. 7, 1908 |
| 1,176,457 | Jones | Mar. 21, 1916 |
| 1,466,057 | Mathews | Aug. 28, 1923 |
| 1,519,018 | Boudreau | Dec. 9, 1924 |
| 2,064,591 | David | Dec. 15, 1936 |
| 2,234,624 | Davis | Mar. 11, 1941 |
| 2,239,227 | Gunnufson | Apr. 22, 1941 |
| 2,650,448 | Lichtig | Feb. 2, 1956 |